United States Patent [19]

Stahl et al.

[11] Patent Number: 5,429,809
[45] Date of Patent: Jul. 4, 1995

[54] PROCESS AND REACTOR FOR CARRYING OUT NON-ADIABATIC CATALYTIC REACTIONS

[75] Inventors: Henrik O. Stahl, Rungsted Kyst; Haldor F. A. Topsoe, Vedbaek, both of Denmark

[73] Assignee: Haldor Topsoe A/S, Lyngby, Denmark

[21] Appl. No.: 199,650

[22] Filed: Feb. 22, 1994

Related U.S. Application Data

[63] Continuation-in-part of Ser. No. 949,025, Sep. 23, 1992, abandoned.

[30] Foreign Application Priority Data

Sep. 23, 1991 [DK] Denmark .............. 1628/91

[51] Int. Cl.$^6$ .................. B01J 8/04; F28D 21/00
[52] U.S. Cl. .................. 422/202; 422/197; 422/198; 422/211; 422/218; 422/222; 422/312
[58] Field of Search ............. 422/202, 197, 198, 211, 422/218, 222, 171, 177, 312; 165/142, 154

[56] References Cited

U.S. PATENT DOCUMENTS

| | | | |
|---|---|---|---|
| 1,087,437 | 2/1914 | Doerflinger | 422/202 |
| 1,826,548 | 10/1931 | Jaeger | 422/202 |
| 1,894,140 | 1/1933 | Wietzel et al. | 422/202 |

FOREIGN PATENT DOCUMENTS 1111135  5/1986  Japan .

Primary Examiner—Robert J. Warden
Assistant Examiner—Hien Tran
Attorney, Agent, or Firm—Ostrolenk, Faber, Gerb & Foffen

[57] ABSTRACT

In a process for carrying out non-adiabatic catalytic reactions in a tubular heat exchange reactor by indirect heat exchange between a process stream and a heat conducting medium, the wall temperature at the critical outlet end of the reactor tube is decreased, by progressively supplying the heat conducting medium to the external surface of the reactor tube in increasing amounts from a region close to the outlet end to a region between the outlet end and the inlet end of the tube.

3 Claims, 2 Drawing Sheets

PROCESS AND REACTOR FOR CARRYING OUT NON-ADIABATIC CATALYTIC REACTIONS

This application is a continuation-in-part of application Ser. No. 07/949,025, filed Sep. 23, 1992, now abandoned.

This invention relates to a process and reactor for carrying out catalytic reactions, and more particularly to a process and reactor, wherein a process stream is non-adiabatic reacted in indirect heat exchange with a heat conducting medium.

Non-adiabatic catalytic reactions, such as the endothermic steam reforming of hydrocarbons and the exothermic methanation reaction are usually carried out in reactor tubes loaded with a catalyst bed, through which a process stream of reactants is forced at elevated pressure. In order to maintain the reactions proceeding in the catalyst bed at a high level and to avoid damage of catalyst, it is necessary to control the temperature in the reacting process stream either by cooling or by heating.

It is known to control temperature by indirect heat exchange between the process stream and a cooling or heating medium, flowing along a heat conducting wall of reactor tubes in heat conducting relationship with the reacting process stream.

Such a process is mentioned in U.S. Pat. No. 4,162,290, wherein during a sequence of primary and secondary reforming a portion of the hydrocarbon feed is heated in a tubular heat exchange reactor by indirect heat exchange with hot effluent gas from the secondary reforming.

A type of heat exchange reactor presently used in industrial applications is the bayonet tube reactor. Conventional bayonet tube reactors consist of an inner tube coaxially arranged in an outer sheath tube. Catalyst particles are loaded in an annular space defined between the walls of the inner tube and the outer tube. A process stream of reactants is, thereby, reacted by passing the stream through the catalyst in heat conducting relationship with heat conducting medium flowing externally along the wall of the sheath tube. When used in heat requiring endothermic reactions, necessary heat for the reactions in the process stream is supplied by a hot fluid flowing in counterflow and indirect heat exchange with the process stream in the tube. Having passed through the catalyst, the reacted process stream impinges against the closed end of the outer tube, where the stream reverses its direction to the inner tube of the reactor, and is then withdrawn from the reactor as product stream.

Use of bayonet tube reactors in steam reforming of a hydrocarbon process stream is disclosed in European Patent Application No. 334,540 and GB Patent Application No. 2,213,496. By the disclosed processes a hydrocarbon-steam stream is reformed in bayonet tube reactors by indirect exchange between hot gas flowing at the outside of the bayonet tubes and the process stream passing through the catalyst inside the tubes in counterflow to the hot gas. Further heat for the endothermic reforming reactions is supplied by the hot product stream of reformed hydrocarbons being withdrawn from the reactor through the inner tube in counterflow and indirect heat exchange with the process stream in the annular space.

A bayonet tube heat exchange reactor with enhanced heat exchanging properties is described in European Patent Application No. 194,067. Heat exchange between heat transferring hot gas and a process stream is, thereby, increased by providing the inner tube of the bayonet tube with an insulation limiting the heat exchange between the product stream and the process stream. The temperature of the process stream is thereby decreased, which results in a greater temperature difference between the process stream and the hot gas and thus in increased heat transfer from the hot gas to the process stream. As further mentioned in this reference highly intense heat exchange is obtained when passing the hot gas in counterflow to the process stream through a sheath surrounding the inlet end of the reactor to a region close to the outlet end.

The above heat exchange processes and reactors, in which a process stream is converted by heating the stream with hot gases flowing externally and in counterflow with the stream inside a bayonet tube reactor, provide an improved process economy by using counterflow heat exchange between heat transferring fluids and a process stream, however, none of these processes and reactors take precautions against critical parameters in reactor materials. As known in the art, the performance of industrial catalytic reactors is not only limited by critical catalyst properties, but also by material parameters, controlled by the temperature level and heat transfer through heat exchanging walls of the reactor tubes. Metallic reactor tubes subjected to stress at high temperatures will deform progressively at a rate, which depends on the metallic material, the stress load and the metal temperature. This deformation is called creep. Creep may lead to rupture of the tubes and thus limit their lifetime. Even small changes of the temperature of the tube material have large effect on the rate of creep. Thus, by lowering the temperature of the tube wall, it is possible to reduce creep in the tube material and, consequently, to prolong the lifetime of the tube.

Accordingly, an object of this invention relates to the improvement in a process for carrying out non-adiabatic catalytic reactions in a tubular heat exchange reactor, by which process the lifetime of the reactor tubes is increased through reduced wall temperatures in critical parts of the tubes.

A further object is to provide a bayonet tube heat exchange reactor, which is useful for carrying out the process.

In accordance with the invention a process stream is catalytically reacted under non-adiabatic conditions in the presence of a catalyst arranged in a tubular reactor with an inlet end and an outlet end, by passing the process stream through the reactor in indirect heat exchange with a heat conducting medium flowing externally along the reactor tube in counterflow to the process stream, the improvement comprises progressively supplying the medium to the reactor tube in increasing amounts from the outlet end to a region between the outlet end and the inlet end of the tube and thereby obtaining a reduced wall temperature of the reactor tube at the outlet end thereof.

The inventive process provides an efficient and economical process for catalytical exothermic as well as endothermic conversion processes in a process stream by reducing the temperature in the reactor wall at the critical outlet end of the reactor tube through supplying the medium progressively to the external surface of the tube over a large area close to the critical outlet end, which by the above reasons prolongs the lifetime of the tubes.

The term "heat conducting medium", used hereinbefore and in the following, means both heat transferring media, such as hot flue gas from a burner or hot product gas from an external process unit, and heat receiving media, such as cooling water or cold process gas.

When carrying out exothermic reactions in accordance with the inventive process, like the synthesis of ammonia or methanol, or the Fischer-Tropsch synthesis, the heat conducting medium is a cooling medium, which is progressively supplied to the external surface close to the outlet end of the reactor tube. Thereby, the mass flow of the cooling medium will become highest in regions of the inlet end of the tube, where the exothermic reactions have their highest cooling demand due to the heat developed during the reactions, which proceed at their highest rate in the catalyst at the inlet end of the tube.

The process of the invention is in particular useful in endothermic catalytic processes, like the steam reforming of hydrocarbons.

By the known steam reforming process a stream of hydrocarbons and steam is catalytically reformed to a product stream of hydrogen and carbon oxides typified by the following reactions:

$$CH_4 + H_2O \rightarrow +CO + 3H_2 \Delta H°_{298} = -49,3 \text{ kcal/mole}$$

$$CH_4 + 2H_2O \rightarrow CO_2 + 4H_2 \Delta H°_{298} = -39,4 \text{ kcal/mole}$$

When carrying out the process in accordance with the invention, the steam reforming reactions are initiated by contact with a steam reforming catalyst in a tubular heat exchange reactor at temperatures above 350° C. In order to ensure a high conversion of hydrocarbons, the temperature of the process stream is gradually raised during its passage through the catalyst. Having passed through the catalyst the reacted process stream leaves the catalyst at the outlet end of the reactor tube as a product stream at temperatures between 750° C. and 950° C. Necessary heat for the endothermic reforming reactions proceeding in the catalyst is supplied by a stream of hot gas flowing along the external surface of the reactor tube with an inlet temperature of between 1,000° C. and 1,300° C. The hot gas is, thereby, progressively supplied to the external surface of the reactor tube in axial direction from the outlet end to the inlet end of the tube within a region intermediate the outlet end and inlet end. In this way, the hot gas is advantageously supplied to the external surface of the tube over a large area at regions close to its outlet end resulting in a decreased heat supply to the tube wall at the hot outlet end.

Furthermore, the amount of heat transmitted from the hot gas to the process stream by forced convection along the heat exchanging wall of the reactor tube increases from preferably about zero at the outlet end to a maximum value in the region at the inlet end of the tube, having the highest heat demand of the process stream.

The invention further provides a bayonet tube type heat exchange reactor, which is suitable for carrying out non-adiabatic catalytical processes by indirect heat exchange with a heat conducting medium.

In accordance with the invention, a bayonet tube heat exchange reactor comprising an outer tube with an inlet end and a closed outlet end, an inner tube coaxially arranged within the outer tube and spaced apart the outer tube, and a catalyst within an annular space between the outer and inner tube, is provided with a sleeve externally surrounding the outer tube and providing a conduit between the sleeve and the outer tube, the sleeve having a plurality of perforations in a region of the sleeve intermediate the outlet end and the inlet end of the outer tube for progressive supply of a heat conducting medium to the conduit and the external surface of the tube.

The region, wherein the sleeve is provided with perforations, may constitute of between 5 and 75%, preferably of between 10 and 50% of the length of the sleeve in the region between the outlet and to the inlet end of the outer tube.

Depending on the reactions being carried out in the reactor and the demand of heating or cooling, thereby involved, it may be preferred to provide the sleeve with further a plurality of perforations in a region, where the sleeve surrounds the closed outlet end of the outer reactor tube.

The perforations ensure progressive supply of the heat conducting medium to the reactor tube near or at its closed outlet end, where a large heat flux and, consequently, a high mass flow of the heat conducting medium has to be avoided in order to reduce temperature and creep in the tube wall.

An optimal supply of heat conducting medium without extensive pressure drop over the sleeve is obtained by arranging the perforations with a diameter of between 1 and 3 mm and pitch of between 10 and 100 mm in the sleeve.

Furthermore, a high mass flow and thus an extensive heat exchange along the external surface of the outer tube is advantageously obtained in the unperforated region of the sleeve adjacent the inlet end of the tube, where the mass flow of the heat transferring medium reaches its maximum value.

The width of the conduit defined by the sleeve and the external surface of the outer tube may vary between 0.01 and 0.08, preferably between 0.02 and 0.05 times of the internal diameter of the outer tube.

Having thus described the invention in general, further aspects and advantages will become more apparent from the following detailed description with reference to the drawings in which,

BRIEF DESCRIPTION OF THE DRAWINGS

FIG. 1 shows in simplified form a longitudinal section of a bayonet tube heat exchange reactor according to the invention. The bayonet tube heat exchange reactor 10 consists of an outer tube 12, which is open at its inlet end 14 and closed at its outlet end 16. Within the outer tube 12 is arranged an inner tube 18 coaxially spaced apart the outer tube 12. Inner tube 18 is open at both ends.

Figure 1:
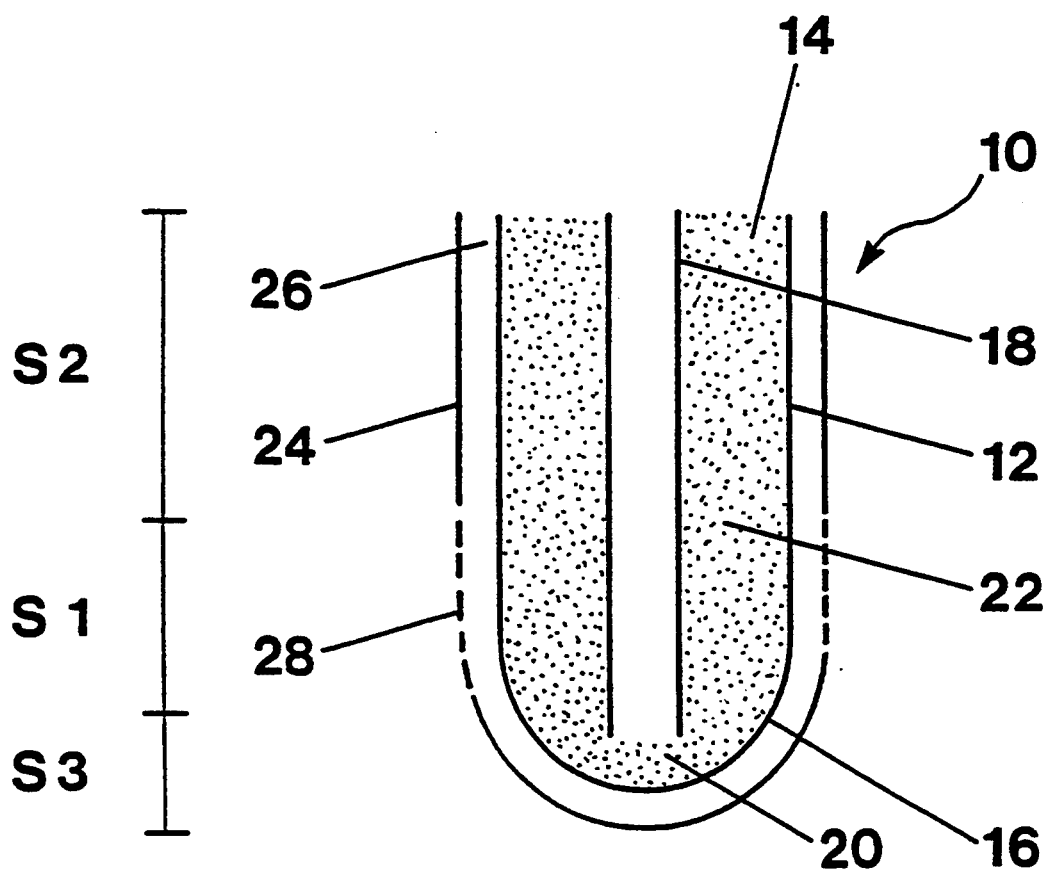
FIG. 1 is a longitudinal section of a reactor tube according to a specific embodiment of the invention.

Reactor tube 10 is further provided with sleeve 24, which completely surrounds the external surface of outer tube 12. Sleeve 24 encloses a space 26 between the external surface of outer tube 12 and sleeve 24. Space 26 provides a conduit for a heat conducting medium, which is supplied through perforations 28 in section S1 of sleeve 24 as further described below. Perforated section S1 extends over a certain length in sleeve 24 within a region between outlet end 16 and inlet end 14 of tube 12.

Process gas is introduced into reactor 10 through open end 14 of outer tube 12. The process gas is then passed through catalyst 22 arranged between the walls of outer tube 12 and inner tube 18. Having passed through catalyst 22 the gas impinges on the tube wall at outer tube outlet end 16, where it reverses its direction to inner tube 18, through which the stream is withdrawn as a product stream.

Cooling or heating of the process stream in catalyst 22 is obtained by a heat conducting medium being supplied to space 26 through perforations 28 in sleeve 24.

The heat conducting medium is introduced over a large area onto the external surface in the lower part of tube 12 through perforated section S1 in sleeve 24 and flows within space 26 along tube 12 in counterflow and indirect heat exchange with the process gas in the tube.

The medium flow increases in space 26 within section S1 by progressively supply of the medium through perforations 28. The medium flow reaches its maximum within region S2 in space 26 adjacent and near the inlet end 14 of tube 12.

In the critical region S3 at the outlet end 16 of tube 12 heat exchange between the heat conduction medium and the process stream is limited to radiation in that substantially no medium flow and, consequently, no forced convection proceeds in space 26 within region S3, which is screened by an unperforated section of sleeve 24.

EXAMPLE

In the following the invention is applied in a computation model illustrating the advantage of the inventive process during the endothermic steam reforming of hydrocarbons by heat exchange with hot flue gas in the reactor described above with reference to FIG. 1.

In the computation model the following dimensions of the reactor are assumed:

| | |
|---|---|
| Outer Tube: | length 7 m, internal diameter 120 mm wall thickness 5 mm |
| Inner Tube: | length 6.1 m internal diameter 30 mm wall thickness 5 mm |
| Sleeve: | length 7 m length of perforated section 3 m length of unperforated section 4 m with a perforation of 1.5% (diameter of perforations about 2 mm, 50 mm pitch) length of sleeve and sections are as distance from the outlet end to the inlet end of the outer tube. The sleeve is spaced 5 mm apart the external surface of the outer tube |

132 Nm$^3$/h of a hydrocarbon-steam process gas are introduced at an inlet temperature of 520° C. into the outer tube of the reactor. By passage through a conventional nickel reforming catalyst arranged between the outer and inner tube of the reactor the temperature of the reacted gas is increased from the above 520° C. to 800° C. at the outlet end of the outer reactor tube. The gas leaves the reactor through the inner tube with an outlet temperature of 570° C. after the gas has given up heat by indirect heat exchange with the reacting gas in the outer tube. Further heat to the reacting gas is supplied by hot flue gas from a burner. The flue gas is supplied at 235 Nm$^3$/h with an inlet temperature of 1300° C. to the sleeve. The gas enters at substantially the same temperature the flue gas conduit between the sleeve end the exterior surface of the outer tube through the perforated section in the sleeve extending over a region of 3 meters from the outlet end of the tube. Inside the conduit the hot gas flows in counterflow and indirect heat exchange with the process gas in the outer tube of the reactor. After having supplied heat to the process gas the flue gas leaves the sleeve adjacent to the inlet end of the outer tube with an outlet temperature of 620° C.

The heat flux at the outlet end of the outer tube is by the above process reduced from about 70.000 kcal/m$^2$ hr as in a corresponding reactor tube without the sleeve to about 20.000 kcal/m$^2$ hr in the reactor tube screened by the sleeve. Within the region of the perforated section in the sleeve the heat flux increases from the above 20.000 kcal/m$^2$ hr almost linearly to about 35.000 kcal/m$^2$ hr, because of the progressive supply of hot flue gas through the perforations in the sleeve. Corresponding values for the reactor without the sleeve and with maximum supply of flue gas in this region show a linear decrease from 70.000 kcal/m$^2$ hr at the outlet end to about 23.000 kcal/m$^2$ hr within a distance of 3 meters from the outlet end of the reactor tube.

Figure 2:
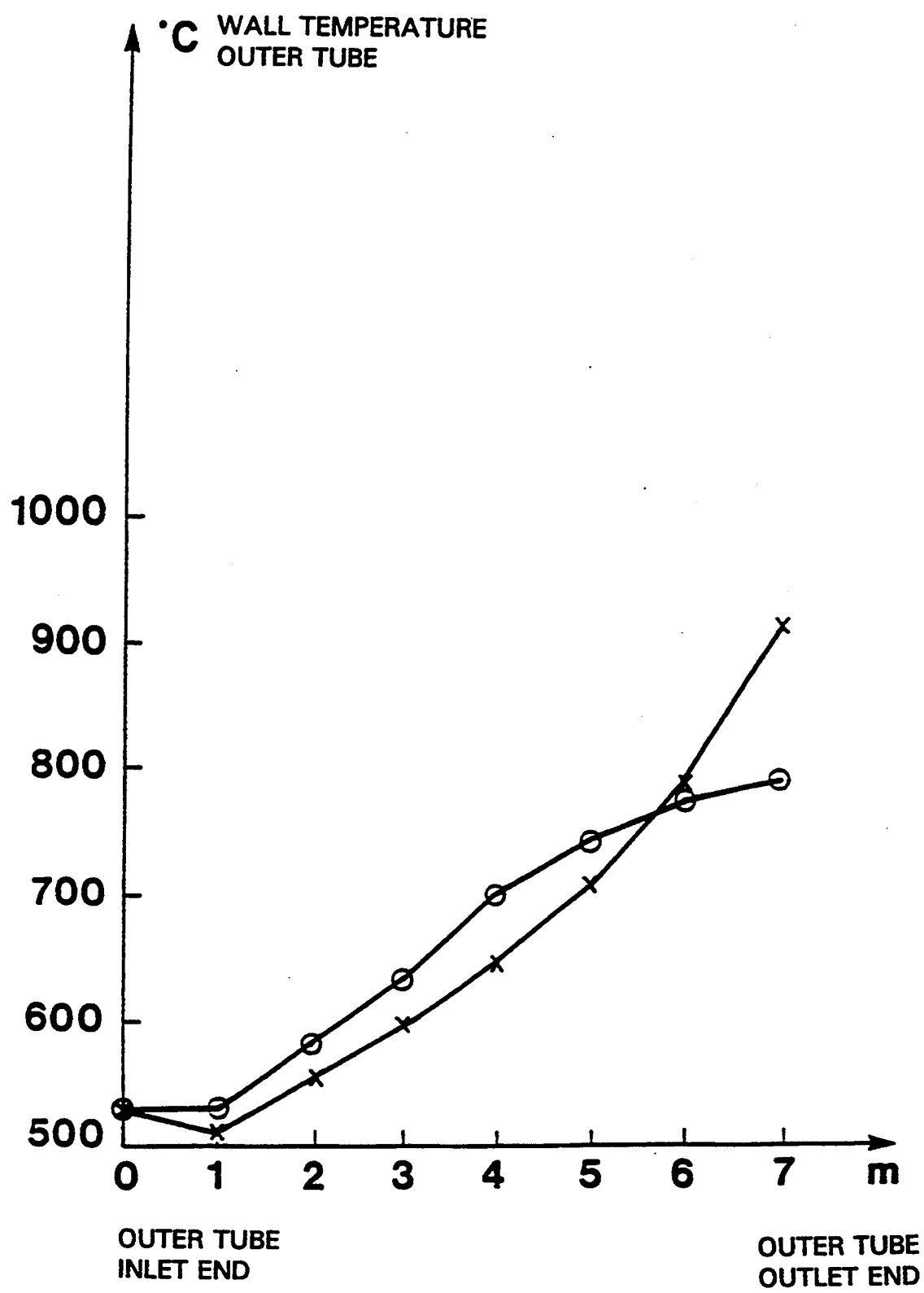
FIG. 2 shows the wall temperature profile obtained in the reactor tube of FIG. 1 compared to the profile obtained in a bayonet reactor tube with maximum flow along the entire wall of the outer reactor tube.

The temperature profile obtained in the wall of the outer reactor tube by the inventive process is further shown in FIG. 2 in comparison to the temperature profile obtained in a reactor tube similar to that of FIG. 1, but without sleve 24, and thus with a maximum supply of flue gas in the region around the tube outlet end.

As apparent from FIG. 2 the wall temperature (0) at the tube outlet end, which is screened by an unperforated section of the sleeve is about 100° C. lower than the wall temperature (X) of the tube without such screening. In the region adjacent to the outlet end, which is surrounded by the perforated part of the sleeve, the axial wall temperature gradient is flattened due to the progressive supply of hot flue gas within this region resulting in less extensive heating of tube wall around its outlet end and, consequently, in a prolonged lifetime of the tube. As an example the lifetime of a HK40 tube with an outer diameter of 120 mm and inner diameter of 110 mm would be increased from 8.4·10$^5$ to 9.4·10$^7$ hours by decreasing the wall temperature from 850° C. to 750° C.

What is claimed is:

1. A bayonet tube heat exchange reactor comprising an outer tube with an inlet end for introducing a process stream therethrough and a closed outlet end, an inner tube, open at both ends, coaxially arranged within the outer tube and spaced apart the outer tube, and a catalyst within an annular space confined between the outer and inner tubes, said reactor being provided with a sleeve externally surrounding the outer tube and defining therebetween a conduit for passage of a heat transferring medium between the sleeve and the outer tube, the sleeve having a plurality of perforations over a portion of the length thereof close to the outlet end of the outer tube for introducing the heat transferring medium into the conduit, said perforations in the sleeve having a diameter of between 1 and 3 mm, said perforations being arrayed with a pitch between 10 and 100 mm, whereby the heat transferring medium flows through the perforated length of the sleeve and along the conduit in counterflow and indirect heat exchange with the process stream passing through the catalyst in the annular space between the outer and inner tubes of the reactor.

2. The reactor of claim 1, wherein the perforated length of the sleeve constitutes of between 5 and 75% of the length of the sleeve extending from the outlet end to the inlet end of the outer tube.

3. The reactor of claim 1, wherein the width of the conduit defined between the sleeve and the outer tube is of between 0.01 and 0.08 times of the internal diameter of the outer tube.

* * * * *